US006907041B1

(12) United States Patent
Turner et al.

(10) Patent No.: US 6,907,041 B1
(45) Date of Patent: Jun. 14, 2005

(54) COMMUNICATIONS INTERCONNECTION NETWORK WITH DISTRIBUTED RESEQUENCING

(75) Inventors: Jonathan S. Turner, St. Louis, MO (US); Zubin D. Dittia, Sunnyvale, CA (US); John Andrew Fingerhut, San Mateo, CA (US)

(73) Assignees: Cisco Technology, Inc., San Jose, CA (US); Washington University, St. Louis, MO (US)

( * ) Notice: Subject to any disclaimer, the term of this patent is extended or adjusted under 35 U.S.C. 154(b) by 0 days.

(21) Appl. No.: 09/520,684

(22) Filed: Mar. 7, 2000

(51) Int. Cl.[7] .......................... H04L 12/28; H04Q 11/00
(52) U.S. Cl. ....................... 370/412; 370/388; 370/394; 370/414
(58) Field of Search ................................ 370/236–352, 370/355–388, 412–414, 394–418, 235; 709/236–243

(56) References Cited

U.S. PATENT DOCUMENTS

| | | | |
|---|---|---|---|
| 4,491,945 A | | 1/1985 | Turner |
| 4,494,230 A | | 1/1985 | Turner |
| 4,630,260 A | * | 12/1986 | Toy et al. .................... 370/355 |
| 4,734,907 A | | 3/1988 | Turner |
| 4,829,227 A | | 5/1989 | Turner |
| 4,849,968 A | | 7/1989 | Turner |
| 4,893,304 A | | 1/1990 | Giacopelli et al. |
| 4,901,309 A | | 2/1990 | Turner |
| 5,127,000 A | | 6/1992 | Henrion |
| 5,173,897 A | | 12/1992 | Schrodi et al. |
| 5,179,551 A | | 1/1993 | Turner |
| 5,179,556 A | | 1/1993 | Turner |
| 5,229,991 A | | 7/1993 | Turner |
| 5,253,251 A | | 10/1993 | Aramaki |
| 5,260,935 A | | 11/1993 | Turner |
| 5,337,308 A | * | 8/1994 | Fan ............................. 370/388 |
| 5,339,311 A | | 8/1994 | Turner |
| 5,402,415 A | | 3/1995 | Turner |
| 5,414,705 A | * | 5/1995 | Therasse et al. ............. 370/352 |
| 5,483,523 A | * | 1/1996 | Nederlof ...................... 370/394 |
| 5,491,728 A | * | 2/1996 | Verhille et al. .............. 375/362 |
| 5,570,348 A | * | 10/1996 | Holden ........................ 370/236 |
| 5,721,820 A | * | 2/1998 | Abali et al. .................. 709/243 |
| 5,784,357 A | * | 7/1998 | Wolker et al. ............... 370/218 |
| 5,842,040 A | | 11/1998 | Hughes et al. |
| 6,011,779 A | * | 1/2000 | Wills ........................... 370/236 |

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS–96–07, Washington University, St. Louis, MO, 20 pages.

Turner et al., "System Architecture Document for Gigabit Switching Technology," Aug. 27, 1998, Ver. 3.5, ARL–94–11, Washington University, St. Louis, MO, 110 pages.

* cited by examiner

Primary Examiner—Man U. Phan
(74) Attorney, Agent, or Firm—The Law Office of Kirk D. Williams

(57) ABSTRACT

Methods and apparatus for forwarding packets in a multi-stage interconnection network are provided which timestamp packets using a substantially system-wide timing reference and a merge sorting variant to restore packets to the proper order, using the timestamp information carried in the packets. One implementation determines when packets passing along different paths in the network can be safely forwarded, even when no packets have recently been received on some of the paths, by forwarding status messages along otherwise idle paths. The status messages provide information that can be used by downstream components to allow them to determine when packets passing over other paths can safely be forwarded. One implementation simultaneously resequences packets being delivered to all n outputs of the multistage interconnection network. The resequencing operations are distributed among a plurality of switching elements making up the interconnection network.

8 Claims, 13 Drawing Sheets

COMMUNICATIONS INTERCONNECTION NETWORK WITH DISTRIBUTED RESEQUENCING

STATEMENT AS TO RIGHTS TO IVENTIONS MADE UNDER UNIVERSITY SPONSORED RESEARCH AND DEVELOPMENT

The invention was performed in the course of work under sponsorship of Washington University of St. Louis, Mo., and Growth Networks Inc., of Mountain View, Calif. Each entity claims joint ownership in the invention. Growth Networks Inc. has exclusive rights under license from Washington University.

FIELD OF THE INVENTION

This invention relates to communications information routing; and more specifically to switch interconnection networks or switch fabrics.

BACKGROUND OF THE INVENTION

Buffered multistage interconnection networks are often used in Asynchronous Transfer Mode ("ATM") and other types of packet switching systems. Networks of this type use buffers to store packets at intermediate points when contention for output links prevents immediate transmission. As used herein, the term packet is used to indicate generically addressable data packets of all types, including fixed length cells and variable length packets.

Many multistage interconnection networks provide multiple paths between network inputs and outputs, allowing the traffic to be balanced across the alternative paths. An example of such a network is shown in FIG. 1A, which is a depiction of an architecture known as a three stage Beneš network. The Beneš network 10 is composed of three stages of switch elements (SE) 12, 14, 16 and two webs of interconnecting links (IL) 18, 20. Switch elements 12, 14, 16 may have any number of input type interconnecting links 24 and output type interconnecting links 26. Letting d denote the number of input links and the number of output links in a single switch element and letting n denote the number of input links and output links of the multistage network as a whole, FIG. 1A illustrates d=4 and n=16. Traffic distribution in a multistage network 10 is commonly done in one of two ways for a given end-to-end session of sending packets from an identified input to an identified output of the network. In systems that use static routing, all packets associated with a given session follow the same path through the interconnection network. (In ATM networks, a session is typically associated with a virtual circuit.) This path is selected when the session begins and typically remains fixed until the session is completed, thus guaranteeing that packets belonging to the same session are forwarded in the order they arrived.

In systems that use dynamic routing, traffic is distributed on a packet-by-packet basis so as to equalize the traffic load across the entire interconnection network. Dynamic routing systems can distribute traffic more evenly than systems that use static routing. Consequently, dynamic routing systems can be operated with lower speed internal links than are needed for systems that use static routing. However, because dynamic routing systems do not constrain the packets belonging to a single user session to a single path, they may allow packets in a given session to get out of order, that is, lose sequence.

Systems using dynamic routing typically provide resequencing mechanisms to restore the correct packet order at the outputs of the switching system. Conventional mechanisms for resequencing usually ensure that packets are delivered in the correct order, but under unusual conditions, they can fail to reorder packets correctly.

A known method for resequencing ATM packets in a multistage interconnection network uses timestamps and time-ordered output queues. Such systems require a central timing reference. The central timing reference signal is distributed to the circuits at all inputs to the network and to the circuits at all outputs. When a packet of data enters the network at an input, the current time is inserted into a timestamp field in the packet. When the packet emerges from the network at the appropriate destination, the timestamp is used to insert the packet into a time-ordered queue. In other words, the packets are read from the queue in increasing order of their timestamp values. Associated with the queue is an age threshold or timeout which specifies the minimum time that must elapse between the time a packet entered the interconnection network and the time it is allowed to leave the resequencing buffer at the output. If the difference between the current time and the timestamp of the first packet in the buffer is smaller than the age threshold, then the first packet is held back (along with all others "behind" it in the buffer). This allows packets that are delayed for a long period of time in the interconnection network to catch up with other packets that experience smaller delays.

If the age threshold is larger than the maximum delay that packets ever experience in the interconnection network, then the time-based resequencing method will always deliver packets in order. However, if packets are delayed by more than the time specified by the age threshold or timeout, errors may occur. In typical systems, delays in the interconnection network are usually fairly small (a few packet times per stage) and packets only rarely experience long delays. On the other hand, a worst-case delay may be very large. As a result, the age threshold is usually set not to the worst-case delay, but to a smaller value chosen to give an acceptably small frequency of resequencing errors. The resequencing delay can be traded off against reduced probability of resequencing errors. Conventional time-based resequencing methods can be implemented in various ways.

Merge sorting, illustrated in FIG. 1B, is a known technique for producing a single sorted list from multiple ordered lists whose values are known a priori. For example, two lists 920 and 922 of known elements sorted in ascending order can be combined into a single sorted list 924 by repeatedly taking the smaller value from the front of lists 920 and 922, and appending the smaller value to the end of list 924. This example can be extended to a set of n known values, which can be sorted by first dividing the set into n lists containing a single value each, then combining pairs of lists to produce n/2 lists with two values each. Pairs of these lists are then merged, producing n/4 list with four values each. Continuing in this fashion eventually yields a single sorted list containing the original values, but in sorted order, as shown in FIG. 1B. Merge sorting an also be implemented using three-way merging (that is, merging three sorted list into a single sorted list in one step), rather than by using two-way merging. More genely, d-way merging can be used for any integer d>1.

However, known sorting techniques are not candidates for resequencing packets in a packet switching environment. In such a dynamic environment, lists of known values are not available. Rather, these packet switching systems must resequence streams of packets. Moreover, in dynamic resequencing systems, a complete set of packets to be resequenced is routinely not available at the time resequencing decisions must be made. Furthermore, the resequencing process is additionally complicated because the streams of packets to be resequenced can be temporarily empty.

Needed are new methods, apparatus, and systems for resequencing information in a dynamic environment.

Prior work known to the inventors is reflected in the following references:

T. J. Chaney, A. Fingerhut, M. Flucke, J. Turner, "Design of a Gigabit ATM Switch," *Proceedings of Infocom*, April 1997.

Z. Dittia, A. Fingerhut, J. Turner, "System Architecture Document for Gigabit Switching Technology," Version 3.10, Washington University Applied Switching Laboratory, January 1996.

J. S. Turner, "An Optimal Nonblocking Multicast Virtual Circuit Switch," *Proceedings of Infocom*, June 1994.

M. A. R. Henrion, U.S. Pat. No. 5,127,000, issued Jun. 30, 1992, entitled Resequencing System for a Switching Node.

J. S. Turner, U.S. Pat. No. 5,260,935, issued Nov. 9, 1993 for Data Packet Resequencer.

J. S. Turner, U. S. Pat. No. 5,339,311, issued Aug. 16, 1994, for Data Packet Resequencer.

J. S. Turner, U.S. Pat. No. 5,402,415, issued Mar. 28, 1995, Multicast Virtual Circuit Switch Using Cell Recycling.

SUMMARY OF THE INVENTION

According to the invention, methods and apparatus are disclosed for resequencing streams of information. One of many embodiments of the invention includes a multistage interconnection network for substantially continuously routing a plurality of packets between a plurality of sources and a plurality of destinations via a plurality of paths passing through a plurality of switching elements of the interconnection network. An embodiment includes a method for delivering packets to outputs of the interconnection network such that said packets passing from any single source to any single destination are delivered to a single destination in the same order as sent from said single source, wherein the packets have been distributed among a plurality of paths in the interconnection network. An embodiment comprises inserting a source timestamp value into each packet as each packet leaves its source, with each source timestamp value indicating the time at which said packet left the source; determining when no future packets received at a given switch element input will have a source timestamp value earlier than a specified value; deriving information about source timestamp values of later arriving packets; and propagating the packets through the switch elements in the network in the order that the packets entered the network using said source timestamp values together with the derived information about source timestamp values of later arriving packets.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus for resequencing streams of information are disclosed. An embodiment includes forwarding packets, including fixed length cells, in a multistage, dynamically-routed interconnection network. Packets are time stamped as they arrive at the interconnection network based on a common timing reference which is used in resequencing the dynamically routed packets back into the proper order. An embodiment includes a method for determining when packets passing along different paths in the network can be safely forwarded, even when no packets have recently been received on some of the paths. An embodiment uses a mechanism that forwards status messages along otherwise idle paths, where the status messages provide information that can be used by downstream components to allow them to determine when packets passing over other paths can safely be forwarded. An embodiment simultaneously resequences packets being delivered to all n outputs of the multistage interconnection network. The resequencing operations are distributed among a plurality of switching elements making up the interconnection network. Merge sorting, modified for dynamic, continuous streams of packets, can be used within a switch element to resequence a multiplicity of sorted arriving packets into a multiplicity of sorted departure packet buffers.

Figure 2A:
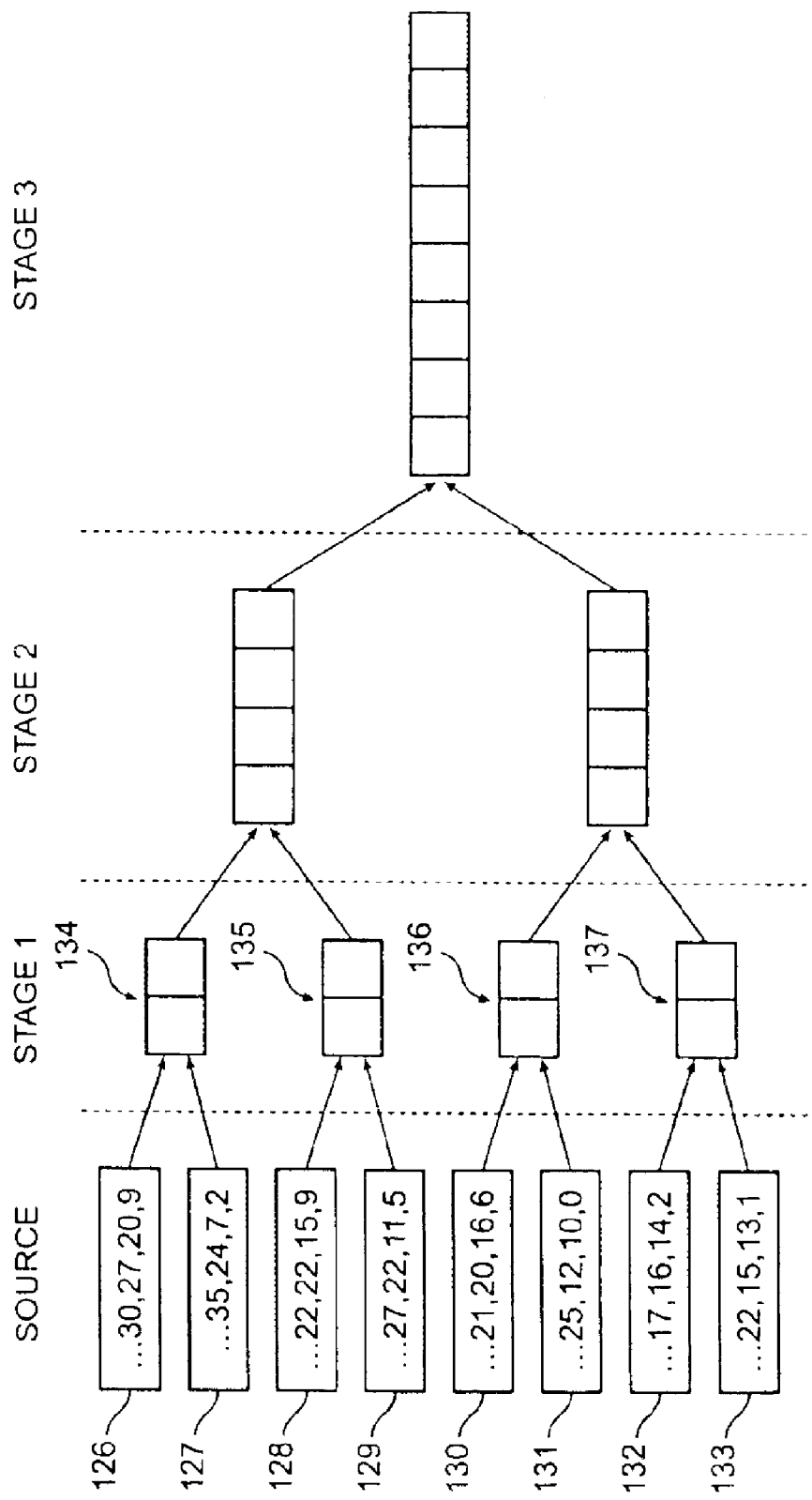
FIGS. 2A–D are schematic representations of successive stages in an example merge sort for reordering eight serial packet streams received in parallel into one resequenced serial packet stream according to the invention.
Figure 2B:
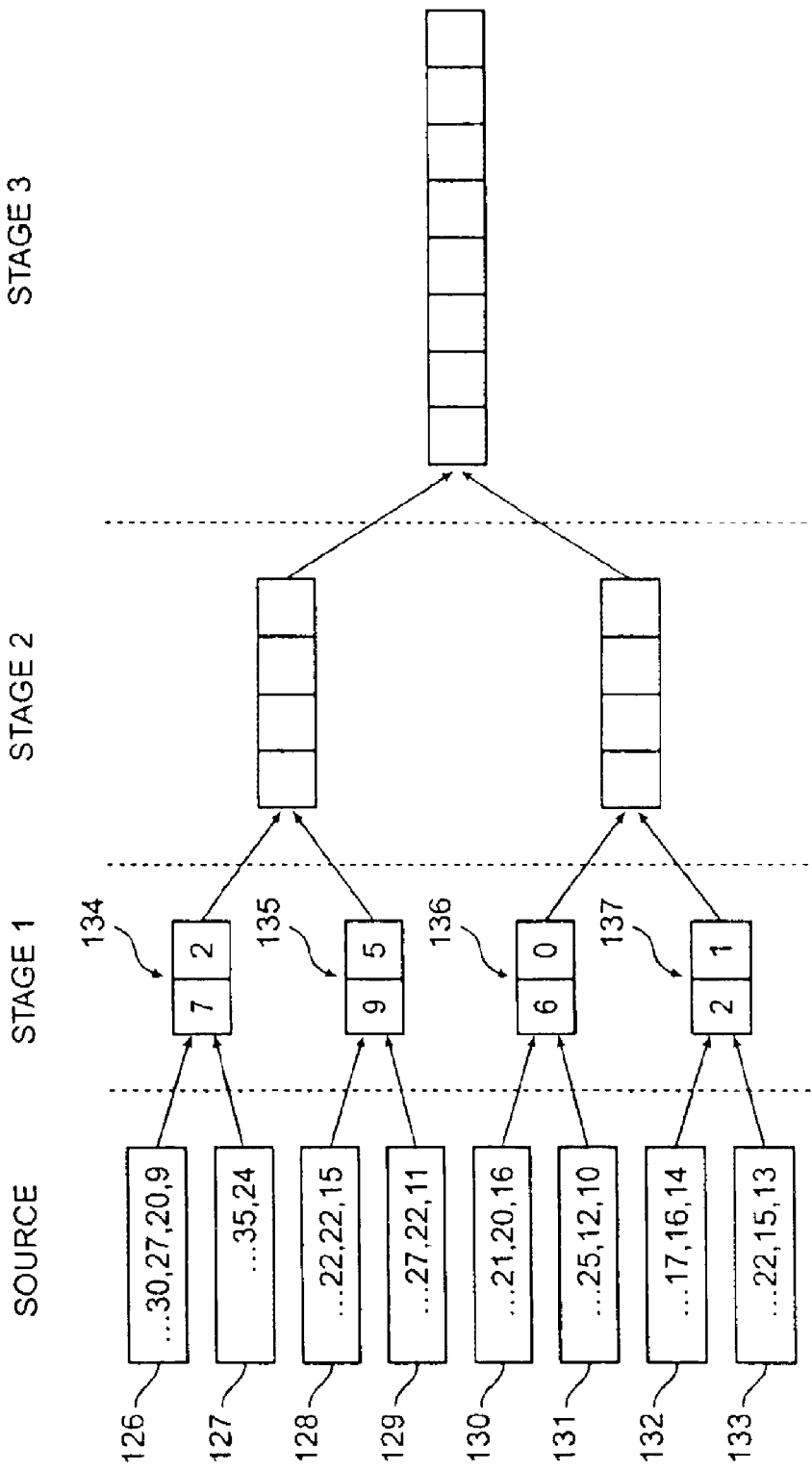

FIGS. 2A–2D illustrate the operation of an embodiment of the invention for distributed resequencing. FIG. 2A shows the timestamps attached to packets as they enter the system from sources 126–133. FIG. 2B shows the system at a later time, after two packets have been processed and deposited in each of the FIFO buffers 134–137 in Stage 1. The system begins to sort continuous streams of data packets by increasing timestamp. For example, packets from source buffers 126, 127 can be combined into a single sorted stream of data packets in Stage 1 FIFO buffer 134 by repeatedly taking the packet with the smallest timestamp available from the buffers 126 and 127 and inserting it into the buffer 134. Both packets shown in Stage 1 FIFO buffer 134 in FIG. 2B came from source 127 in FIG. 2A, because both of these packets had smaller timestamps than any from source 126. This is not an uncommon occurrence.

Figure 2C:
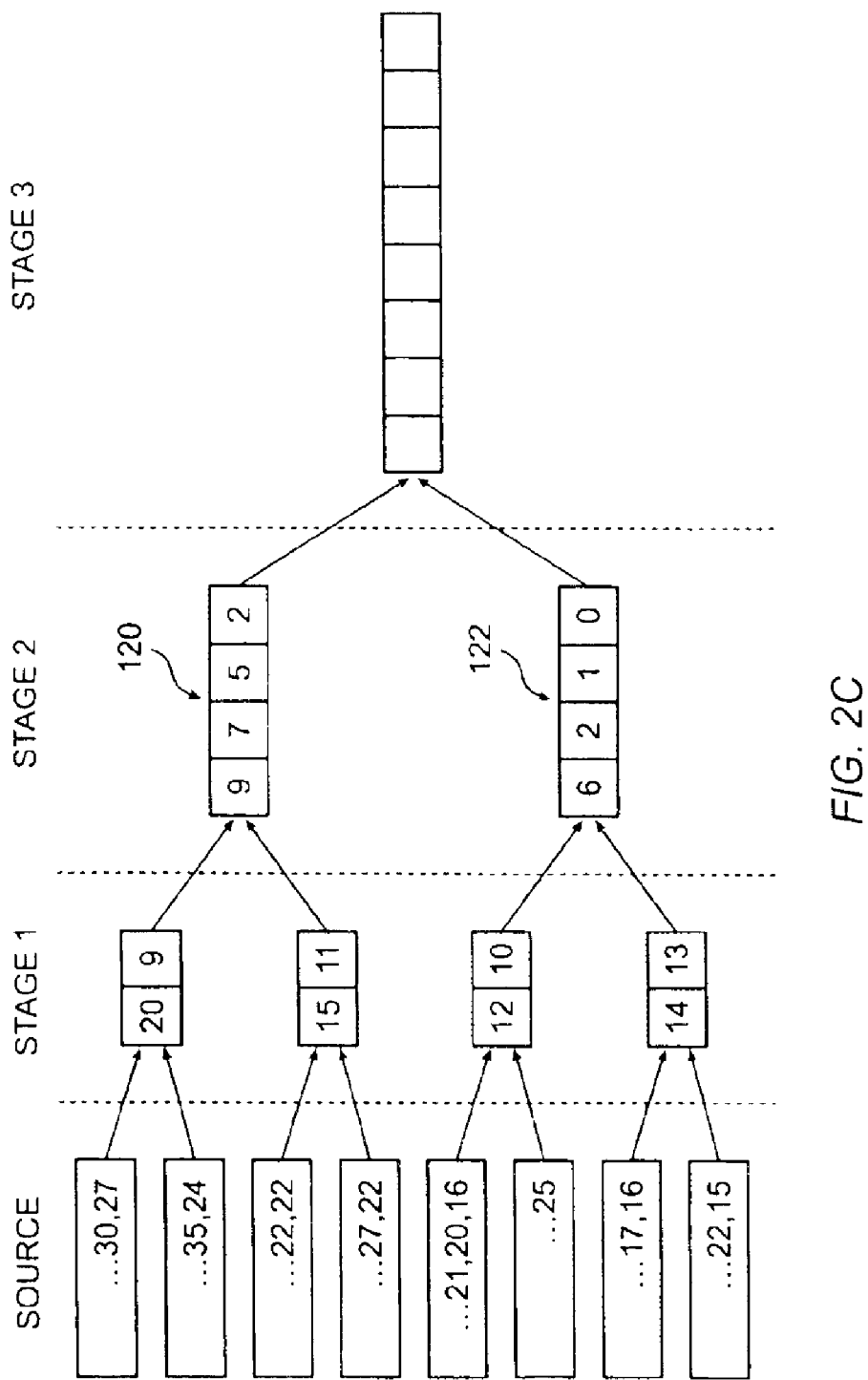
Figure 2D:
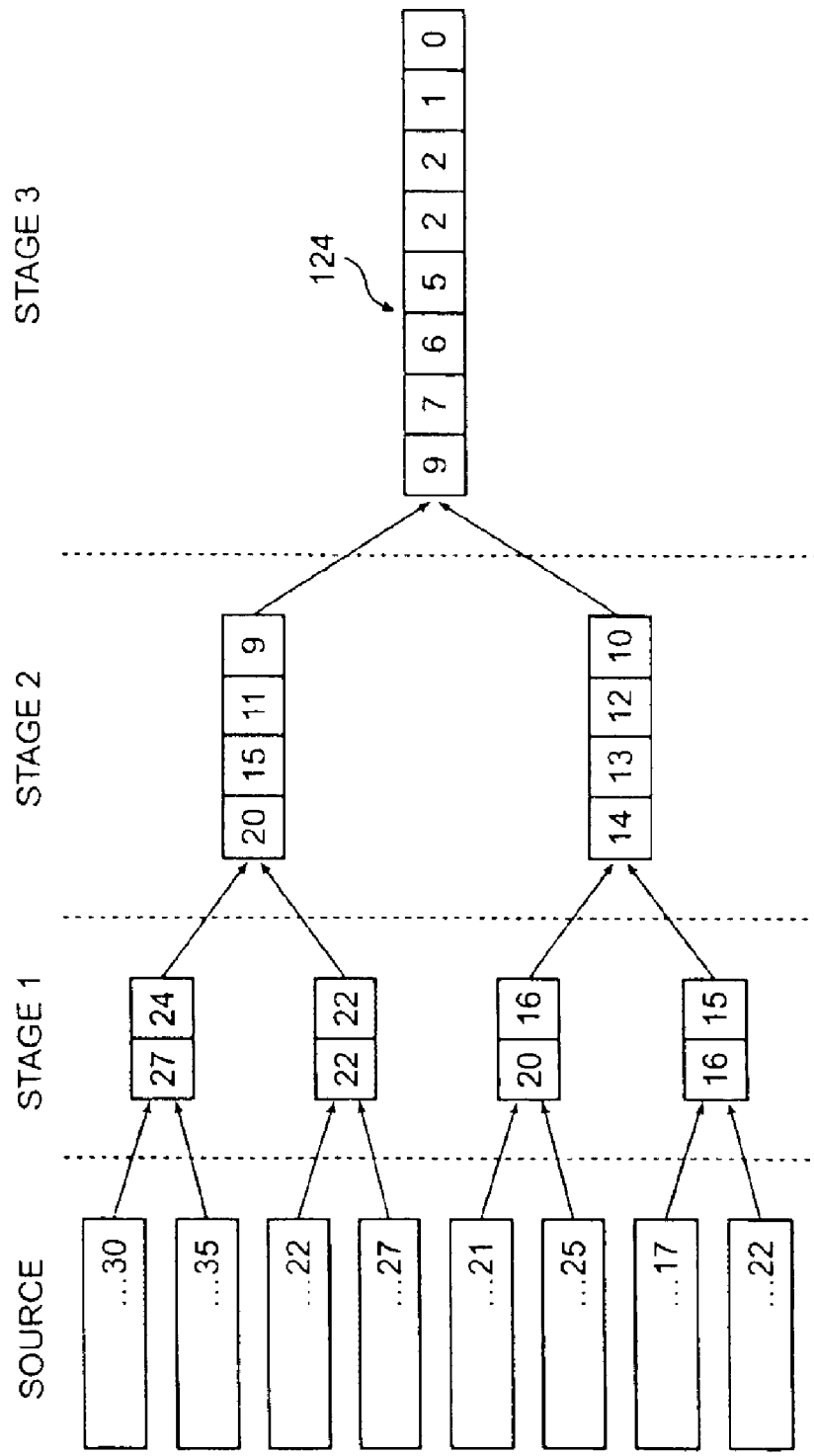

Proceeding in this fashion, an arbitrary set of packets distributed across n source buffers can be sorted by selecting the packet with the smaller timestamp in each pair of source buffers 126, 127; 128, 129; 130, 131; 132, 133, as shown in FIG. 2A, and forwarding that packet to one of n/2 Stage 1 FIFO buffers 134, 135, 136, 137 as shown in FIG. 2B. The process is repeated in n/4 Stage 2 FIFO buffers 120, 122 as shown in FIG. 2C and completed in a FIFO buffer 124 as shown in FIG. 2D, where the first n packets have been stored in sorted order. Note that packets with later timestamps continue to flow into the system and are sorted in a similar fashion in their turn, as FIGS. 2A–D illustrate. FIGS. 2A–2D show a very simplified embodiment of the invention with only a single output and with no indication of the timing or control of the merging streams of timestamps. Other embodiments of the invention provide for multiple outputs and/or accommodating the timing or control of the merging streams of timestamps.

Certain embodiments of the invention further sense empty lists by means of a status message. In one such embodiment, a status message is an inserted packet having a timestamp value, as hereafter explained. A controller uses the timestamp value of the inserted packet to assure that all members of a set of source data packets destined for the same destination buffer have been processed. Embodiments of the invention also simultaneously sort and merge, within a switching element, a multiplicity of sorted streams of packets flowing on an input line into a multiplicity of sorted streams of packets flowing on an output line. The locally-performed sorting is further distributed among a plurality of switching elements forming a multistage interconnection network, so that packets received from a plurality of network sources are properly resequenced at each of a plurality of network destinations at the other side of the multistage interconnection network.

1. A Multistage Network with Distributed Resequencing

Figure 3:
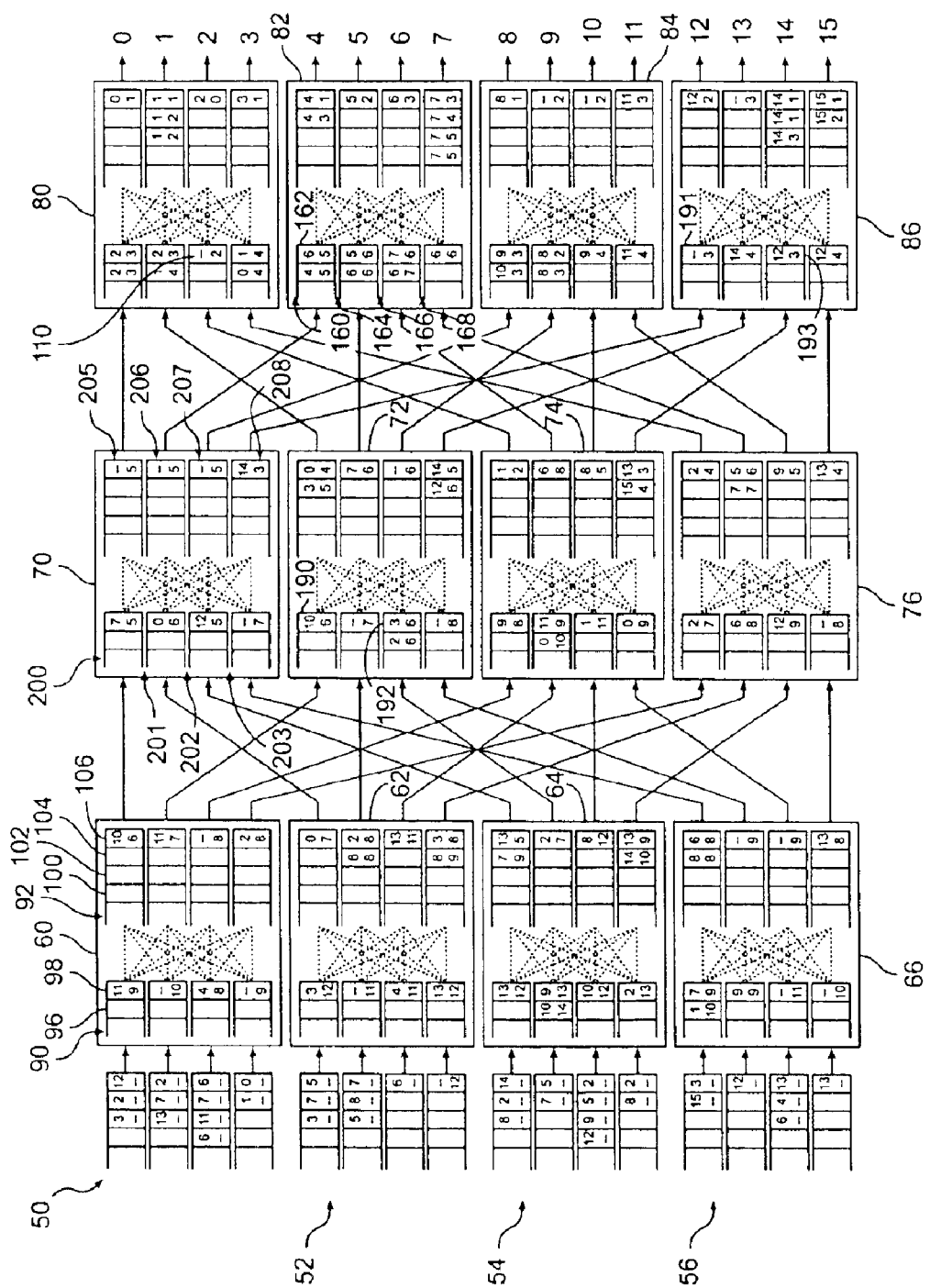
FIG. 3 is a block diagram of a multistage interconnection network with distributed resequencing according to the invention, illustrating the state of the network at the beginning of a cell time.

FIG. 3 illustrates an exemplary multistage network that implements distributed resequencing in accordance with the invention. A set of source buffers 50, 52, 54, 56 is followed by a three-stage network made up of four-port (d=4) switch elements 60, 62, 64, 66; 70, 72, 74, 76; and 80, 82, 84, 86. Each switch element has a two-slot arrival buffer 90 at each of its input ports and a four-slot departure buffer 92 at each of its output ports. Each buffer slot 96, 98, 100, 102, 104, 106 can contain a single fixed length packet, or cell. Small buffers and fixed length packets (known as cells) are used here for illustration purposes, some embodiments typically have more slots per buffer and may provide for variable length packets. In FIG. 3, the presence of a cell in a buffer slot, for instance, slot 98, is indicated by a pair of numbers. The top number in each pair is a value representing an internal address, namely the designation number of the network destination to which the cell is to be delivered. The bottom number in each pair in a slot is a value representing the cell's timestamp, which is the time when the cell passed from the source buffer 50, 52, 54, or 56 (where it originated) to the first stage switch element 60, 62, 64, or 66. If a buffer contains no cells, a status message packet substitute, which is simply a timestamp value without an output designation number will be generated and hereinafter called a floor indication. Floor indications are shown in FIG. 3 as a pair of dashes, as in slots of elements 52, 60, 62, 66, 70, 72, 76, 80 (slot 110), 84, and 86, and a number, indicating the timestamp value. The presence of a floor indication with value j in a buffer means that any cells arriving in the future are guaranteed to have a timestamp at least as large as j.

Figure 4:
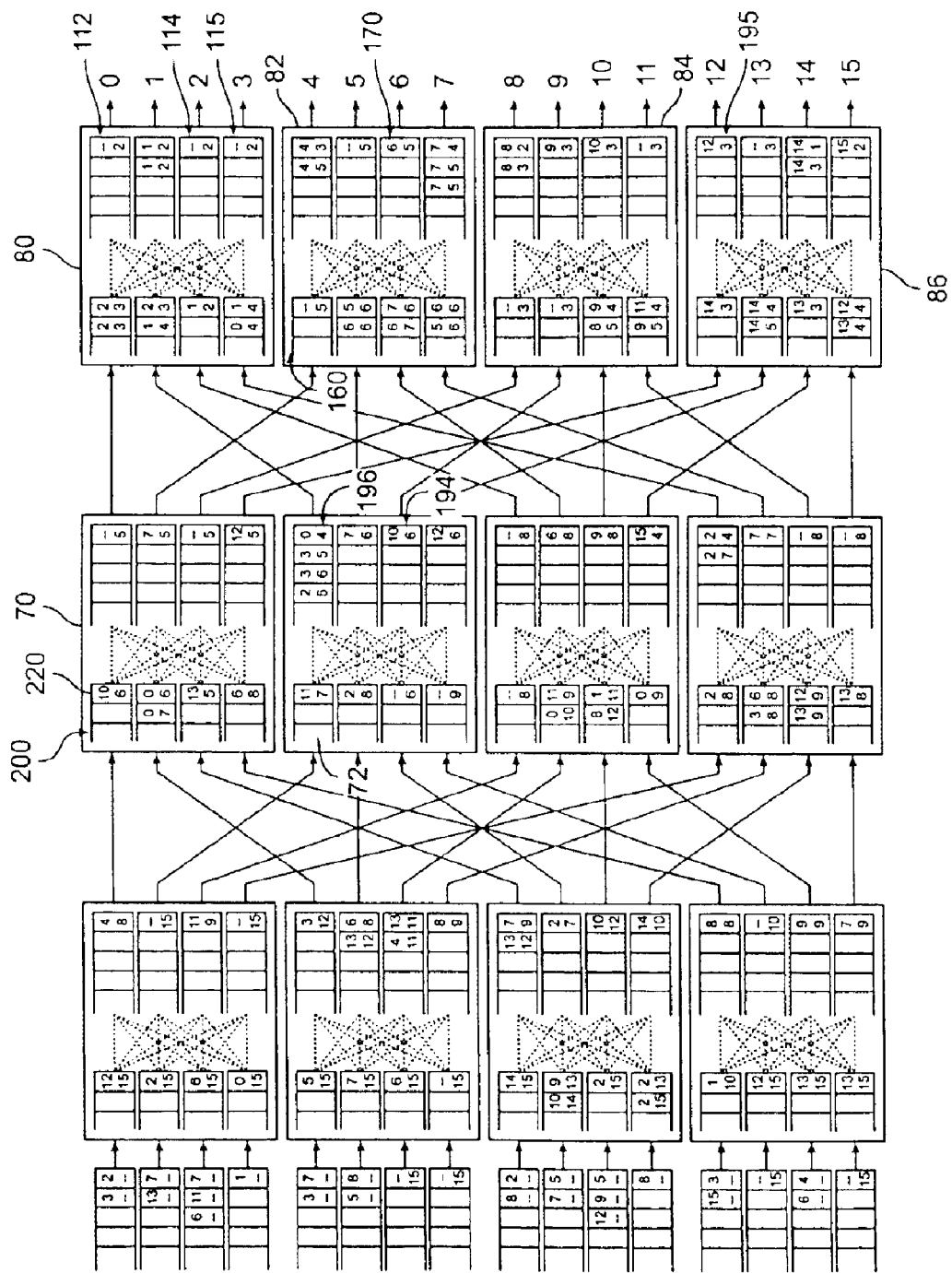
FIG. 4 is a block diagram of the multistage interconnection network of FIG. 3, illustrating the state of the network one cell time later.
Figure 7:
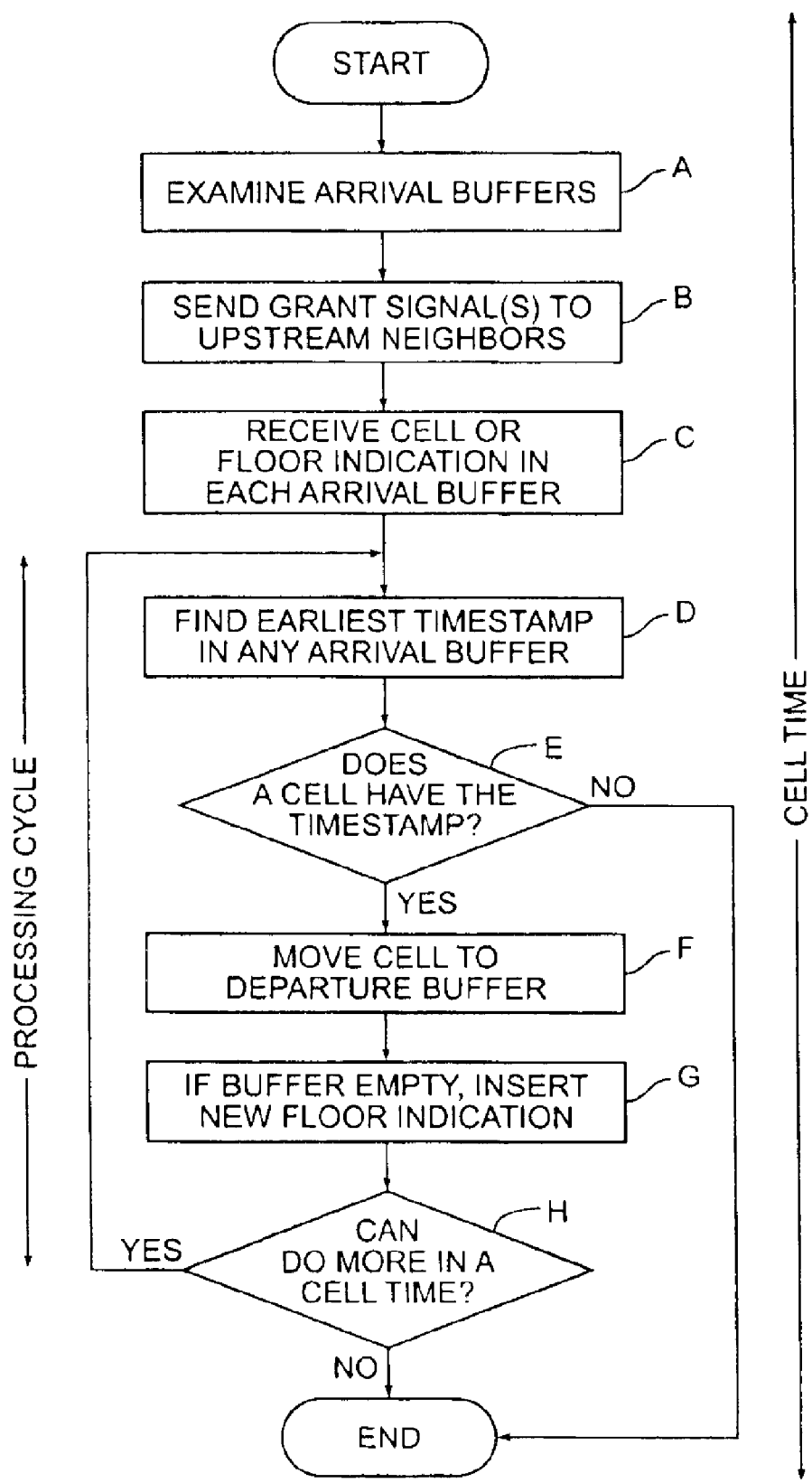
FIG. 7 is a flow chart depicting the events that occur in a switch element within a cell time according to the invention.

FIG. 7 is a flowchart illustrating the steps performed in an embodiment of the invention by each switch element during a cell time, defined as the time required for one cell to be transferred from the output of a switch element to a downstream switch element. FIG. 4 shows the state of the network of FIG. 3 one cell time later. At the start of a cell time, each switch element examines its arrival buffers (Step A). For each arrival buffer that is not full, the switch element transmits a grant signal to the appropriate upstream neighbor element, indicating that it is safe for the upstream neighbor element to transmit a cell (Step B). No cells are transmitted between elements unless a grant signal is received. Other flow control techniques may be used.

Every departure buffer in the upstream neighbor element that has received a grant signal and has at least one cell sends its first cell. Every departure buffer in the upstream neighbor element that has received a grant signal but has no cell sends a floor indication. The timestamp value of the floor indication is the minimum of the timestamps of cells in the upstream neighbor element arrival buffers. For example, FIG. 3 shows that in switch element 70, the minimum timestamp in arrival buffers 200, 201, 202, 203 is "5"; thus, a floor indication with timestamp "5" has been placed in empty departure buffers 205, 206, 207. Buffer 208 is the only departure buffer containing a cell that can be propagated.

Source buffers 50, 52, 54, 56 send cells to first stage switching elements 60, 62, 64, 66 as long as there is room in the arrival buffers of these switching elements. If a source buffer is empty, a floor indication is sent; in a practical embodiment the timestamp value of the floor indication is simply the current time at that input port.

These cells and floor indications are received by the switch element (Step C). For instance, the cell in slot 106 of departure buffer 92 in FIG. 3 has moved to slot 220 of arrival buffer 200 in FIG. 4. When a floor indication arrives at a non-full arrival buffer, it is stored at the end of the arrival buffer, but if the arrival buffer already contains a floor indication as the last element, then the newly arrived floor indication replaces the old one. If a cell arrives at an arrival buffer containing a floor indication as the last element, the cell replaces the floor indication.

The switch element then performs a processing cycle (Steps D, E, F, G, H). The switch element determines the smallest timestamp value associated with any cell or floor indication in its arrival buffers (Step D). For example, in FIG. 3, switch element 82 determines that the smallest timestamp in its arrival buffers 160, 164, 166, 168 is "5."

The switch element next determines whether there is a cell having this smallest timestamp (Step E), for example, the cell in slot 162 of switch element 82. If there is a cell having the smallest timestamp, then the switch element moves the cell to an appropriate departure buffer (Step F); for example, the cell in slot 162 in FIG. 3 has moved to departure buffer 170 in FIG. 4. If this smallest timestamp is associated only with a floor indication, then processing is discontinued until the next cell time. For example, in switch element 80 in FIG. 3, the smallest timestamp in any arrival buffer is "2," which appears only in the floor indication in slot 110, and FIG. 4 shows that no cells have been moved from any arrival buffer in switch element 80. The floor indication "2" appears in empty departure buffers 112, 114, 115 in FIG. 4.

If multiple arrival buffers share the smallest timestamp value, as is the case for example in switch elements 72 and 86 in FIG. 3, then each of these arrival buffers is considered in turn. If the arrival buffer contains a cell, then that cell is advanced to the appropriate departure buffer. If instead the arrival buffer contains a floor indication, nothing is moved from that buffer. For example, in switch element 72, the packets in slots 190 and 192 in switch element 72 (FIG. 3) have moved to departure buffers 194 and 196, respectively, (FIG. 4); in switch element 86, the floor indication in slot 191 in FIG. 3 has not moved in FIG. 4, but it has been overwritten by a new incoming cell. Moreover, the cell in slot 193 in FIG. 3 has moved to output buffer 195 in FIG. 4. Because the buffers in the switch element have limited capacity, no cell will be forwarded from an arrival buffer if the required departure buffer has no space available.

The selection of the appropriate departure buffer depends on the stage in the network at which the switch element is located. In a three-stage network, a typical objective in the first stage is to distribute the traffic as evenly as possible. Thus, a switch element in the first stage 60, 62, 64, 66 routes cells to a departure buffer containing the smallest number of cells, selecting a departure buffer randomly when no single-buffer contains fewer cells than all others. In the second and third stages, a switch element 70, 72, 74, 76; 80, 82, 84, 86 routes each cell to the departure buffer for the outgoing link that lies on the path to the destination output port specified in the cell header.

Referring to FIG. 7, if moving a cell to a departure buffer leaves any of the switch element's arrival buffers empty during the processing cycle, the switch element places a floor indication in the empty arrival buffer (Step G). The timestamp of this floor indication is equal to the timestamp of the last cell that was taken from the buffer.

If time remains in the cell time (Step H), the switch element may perform additional processing cycles. In a practical embodiment a d-port switch element performs at least d processing cycles (Steps D, E, F, G, H) during a single cell time, unless processing is stopped due to a floor indication having the minimum timestamp.

Embodiments of the invention include networks that handle variable sized packets and networks with more than three stages. For example, in a five-stage Beneš or Clos network, typically the first two stages perform the traffic distribution function, while the last three route packets based on their destination. In general, the first k-1 stages of a 2k-1 stage network perform traffic distribution, while the last k stages route packets based on their destination. This method can of course also be applied to networks in which the switch elements have different dimensions (numbers of inputs and outputs) and different buffer capacities and organizations.

The description above focuses on switch elements in which the arrival buffers and departure buffers are all of fixed size, and there is no sharing of memory space. However, in keeping with the scope and spirit of the invention, distributed resequencing can also be applied to switch elements in which some of the storage space is shared, rather than reserved for the exclusive use of particular inputs or outputs. It is required that each buffer have at least one dedicated storage slot, in order to prevent deadlock. The required modifications of the above procedures are straightforward.

To support multicast communication, wherein copies of a given packet are sent to multiple outputs (multipoint communication), the procedure for transferring packets from arrival buffers to departure buffers must be modified. In particular, a packet of minimum timestamp must be forwarded to all departure buffers on paths to its destinations. This need not involve storing multiple copies of the packet. It is sufficient to place a pointer to the stored packet in each of the appropriate departure buffers and store a reference count with the packet, so that the storage space can be released after the last required copy is sent. A switch element can use a variety of methods to decide to which local departure buffers to forward a multicast packet to, including the use of explicit information stored in the packet header, and/or the use of a multicast routing table with the switch element.

So long as the different inputs assign timestamps to packets in increasing order, the collective operation of the system guarantees that the packets delivered at any output of the last stage switch elements will have non-decreasing timestamps.

The timestamps assigned by different network inputs do not have to be strictly synchronized. If one input is slightly ahead of another, this simply means that its packets will be held back a little extra time by the network, so that they can be delivered in timestamp order.

Because the timestamps must be represented using a finite number of bits, certain embodiments of the distributed resequencing methods and apparatus must allow for the possibility of timestamp values that wrap around due to the constraints of a finite representation. This problem can be avoided if the network is operated so that no packet can be delayed more than some maximum time T from the time it first arrives at a source buffer to the time it is delivered to its destination. So long as there is such a maximum delay, then if more than $10g_2$ T bits are used to represent the timestamps, a time value can always be unambiguously interpreted by comparing it to the current time.

2. Systems with Multiple Priorities

Figure 8:
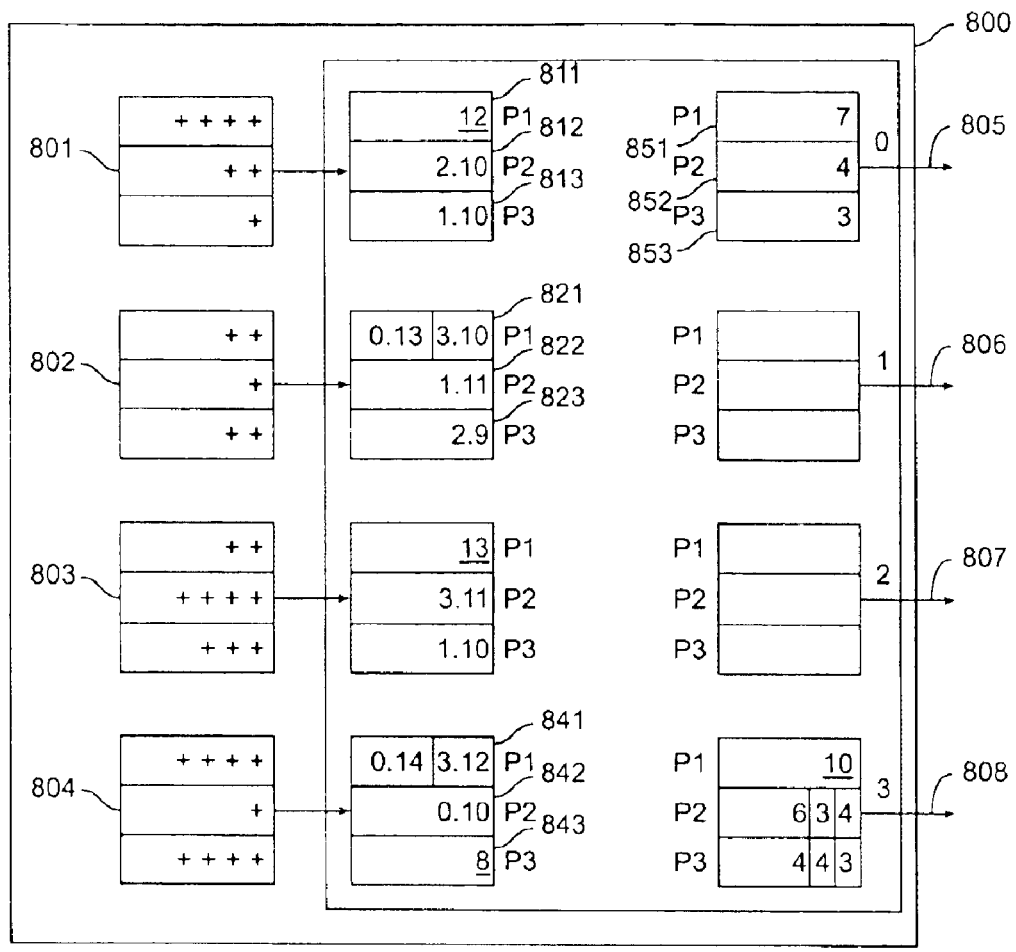
FIG. 8 is a block diagram of a single switch element in a multistage interconnection network according to an embodiment of the invention in which the network supports multiple priorities.

In an embodiment of the invention, preferential treatment can be provided for some traffic relative to other traffic by assigning each packet passing through the system a priority and by handling packets with different priority values differently. Systems using distributed resequencing can accommodate multiple priority classes in accordance with the scope and spirit of the invention. In an embodiment system with m different priority classes, each buffer in FIG. 3 is replaced by a collection of m buffers, where each buffer contains packets of a different priority class. FIG. 8 shows an example four-port switch element 800 that supports three priority classes. Each source port 801–804 can supply packets to any one of three buffers; for instance, source port 801 can supply packets to arrival buffers 811, 812, 813. Likewise, each output port 805–808 can forward packets from one of three buffers; for instance, output port 805 can forward packets from departure buffers 851, 852, and 853. In FIG. 8, a packet is represented by a pair of numbers separated by a period (e.g., in buffer 812) indicating the destination and the timestamp in the format <destination>.<timestamp> in each field where there is a destination. Floor indications are shown here as underlined numbers. Each buffer is labeled P1, P2, or P3 to indicate priority, with P1 being highest priority.

Many different embodiments of systems handling multiple priority classes are possible in keeping with the scope and spirit of the invention. One such exemplary embodiment system with multiple priority classes differs in the following respects from a typical embodiment system with a single priority class.

If an output port of a given switch element has packets waiting in several of its buffers, one of the buffers is selected and the first packet in the selected buffer is forwarded. There are many criteria that can be used to select the buffer, depending on the desired treatment of different priorities. In the simple case of strict priority, the different priority classes are ordered and a packet of highest priority is always selected in preference to other waiting packets, even if the other waiting packets have been waiting for a longer time. For example, in FIG. 8, the packet in departure buffer 851 would be selected for forwarding via output port 805 even though the packet in departure buffer 852 has a smaller timestamp.

If a floor indication is sent only when there are no packets of any priority waiting in the departure buffers, downstream elements may stall. To avoid this problem, floor indications must be sent from one switch element to another from time to time for each of the priority classes. In one embodiment of the invention, each switch element periodically sends a special packet that contains just the floor indications for each of the priority classes for which there are currently no waiting packets. In alternative embodiments, part of each packet is dedicated to carrying floor information on either a periodic basis or an adaptive basis. For example, a floor indication for a given priority class could be sent if neither another floor indication nor a packet of that priority class has been sent for the last S cell times, where S is a parameter.

The procedure for moving packets from arrival buffers to departure buffers must also be modified appropriately. A given priority class is said to be active if there is one or more packets of that priority class that have the minimum timestamp among the arrival buffers of that priority class, and if the departure buffers can accommodate the transfer of one of these packets. For example, in switch element 800 of FIG. 8, priority classes P1 and P2 are active, while priority class P3 is not. During a given cell time, a switch element will move as many packets as possible from arrival buffers to departure buffers, giving preference to higher priority packets so as to provide the desired preferential treatment. During each processing cycle, the switch element will consider which priority classes are active, select one of the active priority classes, and move a packet of minimum timestamp for the selected class from its arrival buffer to the appropriate departure buffer. Thus, switch element 800 will first move a packet from buffer 821, then a packet from buffer 841. At that point, the minimum timestamp for packets with priority P1 is that of the floor indication in buffer 811. Since no more P1 packets can be moved, switch element 800 will begin to move P2 packets if the cell time has not been exhausted.

If a departure buffer of a switch element becomes empty, it is assigned a floor indication whose timestamp is the minimum timestamp among the arrival buffers associated with the same priority class as the departure buffer. In FIG. 8, if the packet is moved out of buffer 853, a floor indication with a timestamp of "8" would be placed in buffer 853. If an arrival buffer becomes empty (meaning it has no packet and no floor indication received from its upstream neighbor), then it is given a floor indication whose timestamp value is equal to that of the last packet forwarded from that buffer.

To ensure that a switch element does not send packets to a downstream neighbor that has nowhere to store them, a downstream switch element must supply its upstream neighbors with flow control information. In the multi-priority case, this can take the form of a grant vector containing one bit for each of the priority classes, indicating whether or not a given upstream neighbor has permission to send a packet in that priority class. Other flow control techniques may also be used.

As with the single priority case, memory can be shared among the various buffers as long as each buffer has at least one dedicated storage slot in order to avoid the possibility of deadlock.

3. Systems with Per Output Buffers

Figure 5:
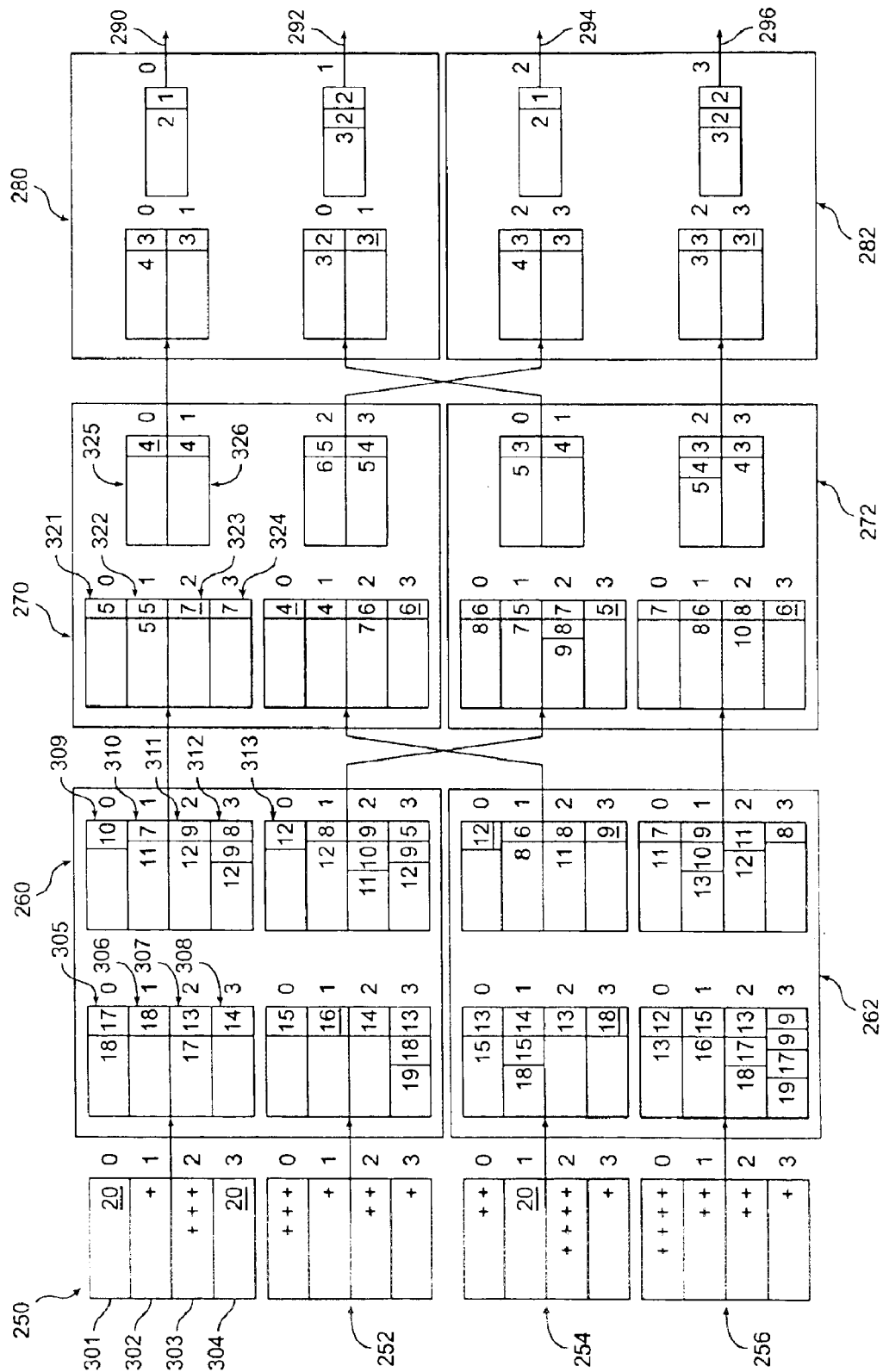
FIG. 5 is a block diagram of a multistage interconnection network according to an embodiment of the invention with separate output buffers along each of the possible paths to an output port.

In an embodiment of the invention, traffic going to congested outputs is isolated so that it does not cause unnecessary delays for traffic going to uncongested outputs. This is achieved by maintaining separate buffers within switch elements for each network output, a configuration referred to as "per output" buffers. FIG. 5 gives an example of a three-stage network made up of two-port switch elements 260, 262, 270, 272, 280, 282. In this system, a network input element 250 has four arrival buffers 301–304, matched to the four network outputs 290, 292, 294, 296. Each buffer is labeled with the network output port number that the stored packets are destined for (0, 1, 2, 3). A plus sign (+) is used to indicate the presence of a packet in a source buffer, for instance in buffer 302. The destination is not shown, since it can be inferred from the buffer. Floor indications are shown on the diagram by entries with an underlined timestamp, for instance in buffer 301. The first stage switch elements 260, 262 similarly have separate arrival buffers 305–308 and departure buffers 309–312 for each of the different network outputs. The presence of a packet in these buffers is represented by a number indicating the timestamp; again, the destination port can be inferred from the buffer. Packets move from arrival buffers to corresponding departure buffers based on their destination; for instance, packets in arrival buffer 305 move to departure buffer 309 or departure buffer 313. In the first stage, a departure buffer is chosen for each packet based on the objective of distributing traffic evenly. In the second stage switch elements 270, 272, there are four arrival buffers 321–324 for each input port but only two departure buffers 325, 326 for each output port, since only the departure buffers corresponding to destinations that can actually be reached through a given link are needed. The number of buffers in the third stage 280, 282 is reduced even further, for the same reason.

The operation of a system with per output buffers differs in the following respects from the operation shown in FIGS. 3, 4, and 7.

If there are several nonempty buffers at a particular switch element output, one of the buffers is selected to transmit a packet during each cell time. For instance, only one of buffers 309, 310, 311, and 312 will be selected. Typically, the switch element will attempt to treat each network output equally by implementing a round robin scheduling discipline.

Similarly, the procedure for moving packets from arrival buffers to departure buffers is modified within a switching element. A given network output is active at a switch element if the smallest timestamp in the arrival buffers associated with that network output is that of a packet, rather than a floor indication and if the departure buffer for the given network output can accept another packet. For instance, in switch element 272, network outputs 0, 1, and 2 are active, while network output 3 is not. The switch element transfers as many packets from arrival buffers to departure buffers as possible during a given cell time. To provide fair treatment of all network outputs, the switch element can use round robin scheduling when selecting an active output during each processing cycle.

From time to time, floor indications must be sent from each switch element to its downstream neighbor elements for all empty buffers. In a large system with per output buffers, the number of floor indications that must be sent can become prohibitive. However, as will be discussed below, in the context of systems with reduced per output buffers, this problem can be avoided by combining and transmitting floor indications in a bandwidth-efficient manner.

The number of separate buffers required in a switch element can become large. For instance, if the network of FIG. 3 were modified to provide per output buffers, each first stage switch element 60, 62, 64, 66 would require 128 distinct buffers (64 arrival buffers and 64 departure buffers), while each second stage switch element 70, 72, 74, 76 would require 80 buffers (64 arrival buffers and 16 output buffers) and each third stage switch element 80, 82, 84, 86 would require 20 buffers (16 arrival buffers and 4 output buffers). In general, a multistage interconnection network with d-port switch elements, 2k-1 stages, and $n=d^k$ requires 2dn distinct buffers in each of the first k-1 stages, dn+n in the center stage, and n+n/d in the stage following the center stage. Switch elements in subsequent stages require 1/d times the number of buffers as switch elements in the immediately preceding stage; thus, the last stage switch elements require $d^2+d$ buffers each. To reduce memory requirements, switch element buffers can be implemented using linked list techniques so that only the list headers need to be replicated for each network output. This makes it practical for a switch element to implement several thousand distinct buffers. To ensure that deadlock cannot occur, each buffer must have at least one packet storage slot dedicated to it.

A system with per output buffers can also support m priority classes by further increasing the number of buffers. In particular, to convert a single priority system with per output buffers to a system supporting m priority classes requires that each buffer be replaced with m buffers, one for each class. The single priority case is discussed here, the extension to multiple priorities is straightforward.

4. Systems with Reduced Per Output Buffers

Figure 6:
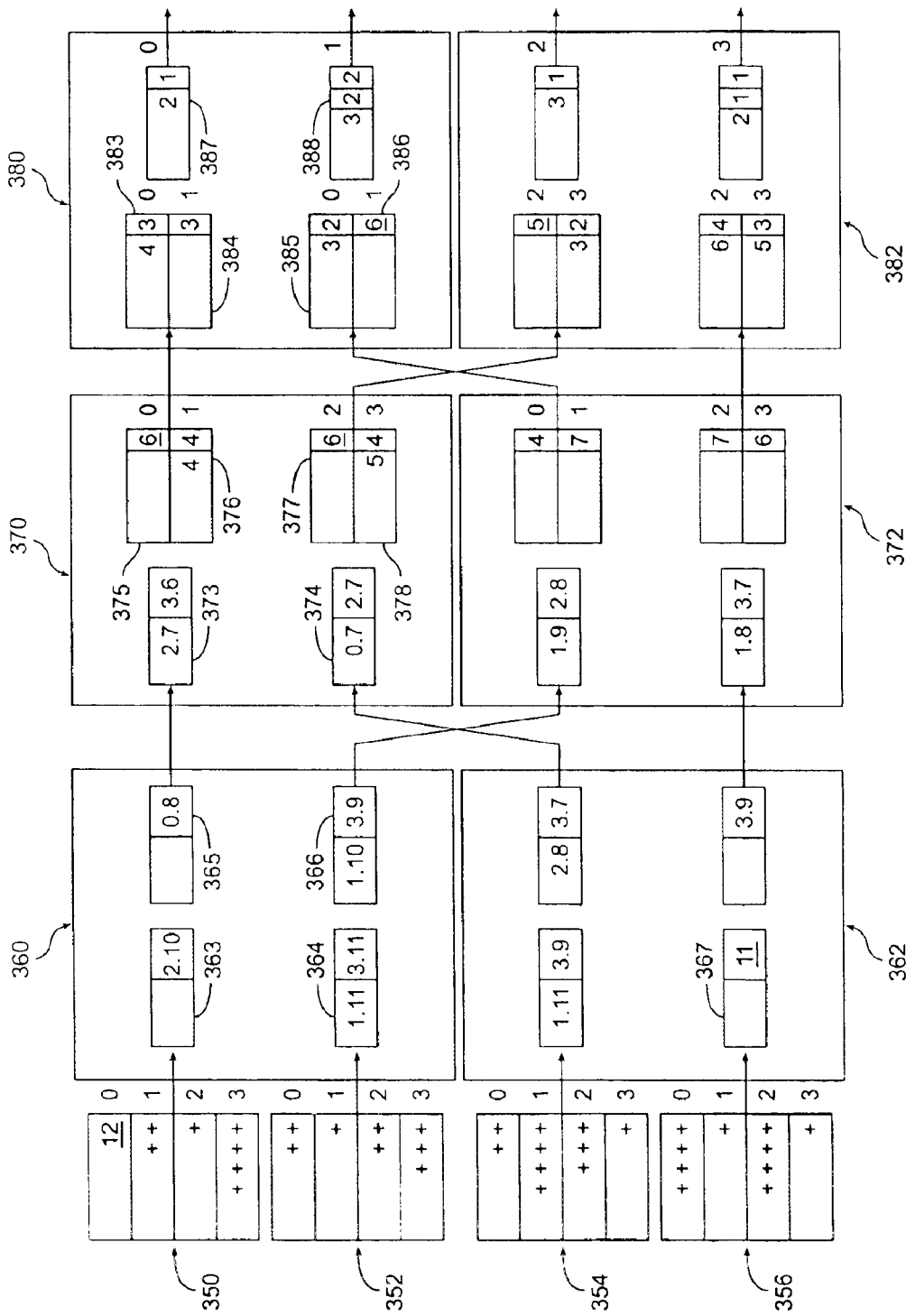
FIG. 6 is a block diagram of a multistage interconnection network according to the an embodiment of the invention with an optimized number of buffers.

The number of distinct buffers needed for per output queuing can become large enough to limit the size of systems that can be built. Thus, it is significant that the number of buffers needed in each switch element can be substantially reduced by restricting the use of per output buffers to the final stages of the network, where they are most beneficial. An embodiment with reduced per output buffers is illustrated in FIG. 6, which shows a three-stage network with two-port switch elements. In this network, the first stage switch elements 360, 362 have just a single buffer per input port 363, 364 and a single buffer per output port 365, 366, as in the system of FIG. 3. In these switch elements, each packet is represented by a decimal number, as in buffer 363: the destination appears before the decimal point, and the timestamp appears after it. Floor indications are represented as underlined whole numbers, as in buffer 367. The second stage switch elements 370, 372 have a single arrival buffer per input port 373, 374, but have separate departure buffers for each network output 375–378. The third stage switch elements have separate arrival buffers 383–386 and departure buffers 387, 388 for each reachable output. In buffers dedicated to a single network output, for instance, buffer 378, the destination of each packet has been suppressed. Note that the source buffers 350, 352, 354, 356 are still organized on a per output basis. In this system, the first stage switch elements operate like the first stage switch elements in the system of FIG. 3, while the third stage switch elements operate like the third stage switch elements in the system of FIG. 5. The center stage switch elements provide a transition from the shared buffers used in the first stage of the network to the per output buffers used in the third stage.

Providing effective traffic isolation in the system of FIG. 6 requires the introduction of a per output flow control mechanism to prevent departure buffers in the center stage switch elements from becoming full. In particular, when the buffers in the center stage switch elements for a particular network output become nearly full, a flow control signal is sent to all of the source buffers 350, 352, 354, 356, telling them to suspend transmitting packets to the congested output. For instance, if buffer 376 is close to being full, a signal is sent to all four network inputs telling them to suspend transmission of packets to output port 1. More precisely, there is a threshold defined for the departure buffers in the second stage switch elements. When the number of packets in a buffer exceeds the threshold, a flow control signal is sent, shutting off the flow of packets to the congested output. After the number of packets in the buffer drops below the threshold again, the network inputs are allowed to resume transmission of packets to the congested output. As long as flow control is exerted early enough to prevent buffers in the second stage switch elements from filling up, the system can maintain effective traffic isolation among the different outputs. This requires enough packet storage slots in each switch element to ensure that the buffer does not run out of space between the time the buffer level rises above the threshold and the time the inflow of packets to a congested output stops.

To implement this reduced per output buffering in the system of FIG. 3, each first stage switch element requires 8 separate buffers, each second stage switch element requires 20 buffers and each third stage switch element requires 20 buffers. To avoid deadlock, each of these buffers must have at least one dedicated packet storage slot. The approach can be generalized to systems with more than three stages. In a system with d-port switch elements, 2k-1 stages, and $n=d^k$, the switch elements in the first k-1 stages of this network can use shared buffers, so each of these switch elements has 2d buffers. The switch elements from the middle stage onward can use per output buffers. In this case, each center stage switch element will have d+n buffers, each switch element in the next stage will have n+n/d buffers and switch elements in each subsequent stage will have 1/d times the number in the immediately preceding stage. The approach can also be generalized further to have per output buffering start later than the center stage. In this case, the per output flow control must be implemented at the stage where the transition from shared to per output buffers occurs.

With per output buffering, a switch element must send floor indications to its downstream neighbors for each of its departure buffers. The amount of information that must be exchanged because of this can become impracticably large. With reduced per output buffering, it is possible to greatly reduce the amount of floor information that must be sent by combining floor indications for different departure buffers in the form of floor vectors, which are generated by each switch element in the stage where the transition from shared buffers to per output buffers occurs, typically the center stage. In any one of these switch elements, for instance, in switch element 370 of FIG. 6, all empty departure buffers must have the same timestamp value for their floor indications because the timestamp of the floor indication is the minimum of the timestamps in the switch element's arrival buffers. Thus, if a switch element has multiple empty departure buffers associated with one of its output links, it does not need to send the timestamp information repeatedly for each empty departure buffer. Instead, it can send a single timestamp value, along with a bit vector that specifies which of the departure buffers using that link are currently empty. If m bits of the bit vector are set to 1, indicating an empty buffer, this is equivalent to sending m separate floor indications. Once generated in the stage where the transition from shared buffers to per output buffers occurs, floor vectors are propagated to downstream neighbors. In a large system, this technique can reduce the amount of information that must be sent to represent floor indications by more than an order of magnitude.

5. Delayed Packet Forwarding

Figure 9:
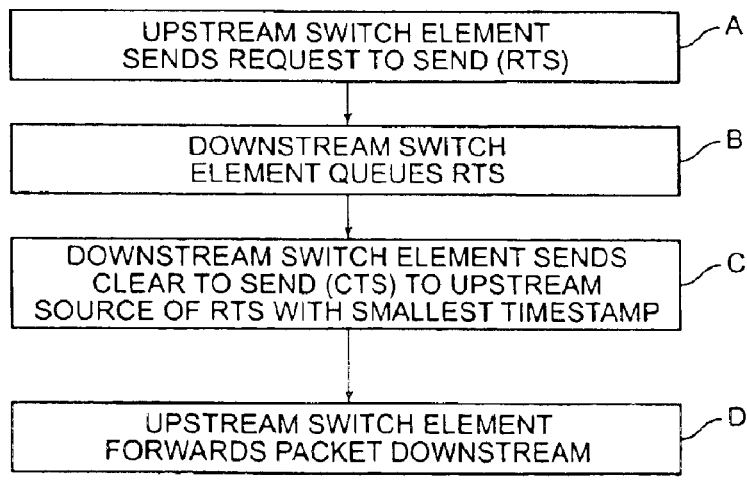
FIG. 9 is a flow chart depicting a protocol for delayed packet forwarding to reduce memory requirements in the final stages of a network with per output buffers.

Restricting the use of per output buffers to the last half of a network greatly reduces the number of separate buffers that a switch element must implement, substantially reducing its memory requirements. In a three-stage network such as that of FIG. 6, the memory required in the third stage switch elements can be reduced by holding packets in the second stage switch elements until the third stage switch element is ready to move them to its output buffers. This can be done by implementing a transfer protocol between adjacent switch elements, as shown in the flowchart of FIG. 9. First, the upstream (second stage) switch element sends a request-to-send (RTS) message (step A), requesting permission to send a packet with a specified destination and timestamp to the downstream (third stage) switch element. The downstream switch element stores this message in its arrival buffer (step B). When the timestamp of the RTS message is the smallest for the specified destination, the downstream switch element transmits a clear-to-send (CTS) message (step C) instructing the upstream neighbor to forward the packet. Finally, the packet is forwarded to the downstream neighbor (step D). Thus, each arrival buffer slot in a third stage switch element requires only enough memory to store a timestamp. Deadlock will not occur as long as each third stage switch element has enough storage space for n timestamps.

This modification reduces overall memory requirements because fewer buffers are needed in order to avoid deadlock in the second stage switch elements in an embodiment where the second stage switch elements do not use per output buffers on the input side. As long as each of the d arrival buffers in a middle stage switch element has room for a single packet and there is room for at least one packet to be stored on the output side, then deadlock cannot occur. In practice, more storage space than this is required for good performance, but not to avoid deadlock.

6. Application to Folded Networks

Interconnection networks like the Beneš and Clos networks are most conveniently described in the form discussed above. However, there is a well-known variant known as a folded network that can be used instead. In the unfolded networks described above, the inputs and outputs of switch elements are independent. In folded networks, inputs and outputs are paired together, so that adjacent switch elements are connected by a pair of oppositely directed links, allowing packets to be sent in both directions between switching elements. Folded networks are advantageous in networks where it is necessary to send informational or control packets in the opposite direction that the data packets move, since the same signal pins that carry data packets in one direction can also carry the status/control information in that direction. Hence, separate control lines and pins, which are inherently required in an unfolded network, are not required in a folded network.

Figure 1A:
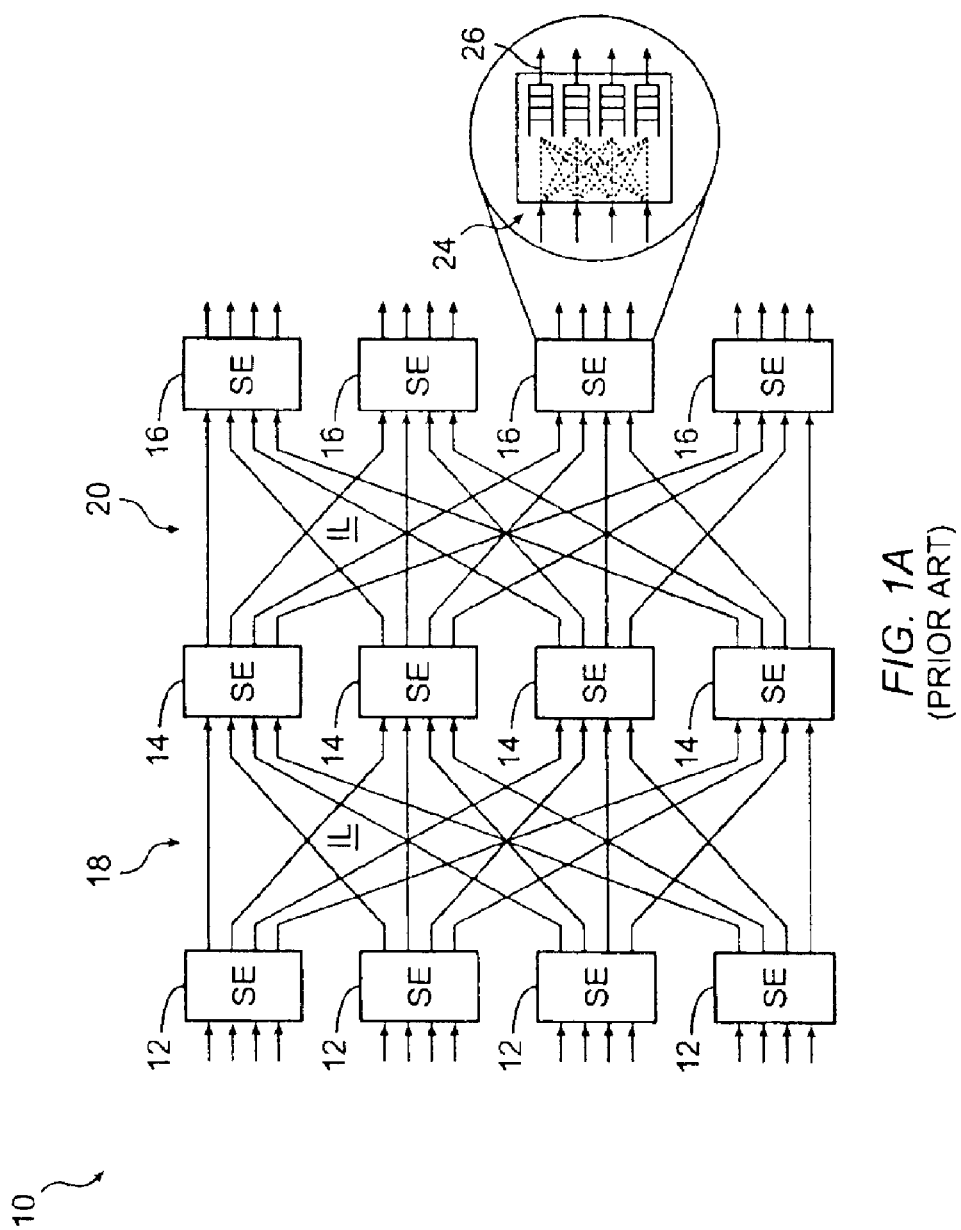
FIG. 1A is a block diagram of a prior art multistage interconnection network.
Figure 1B:
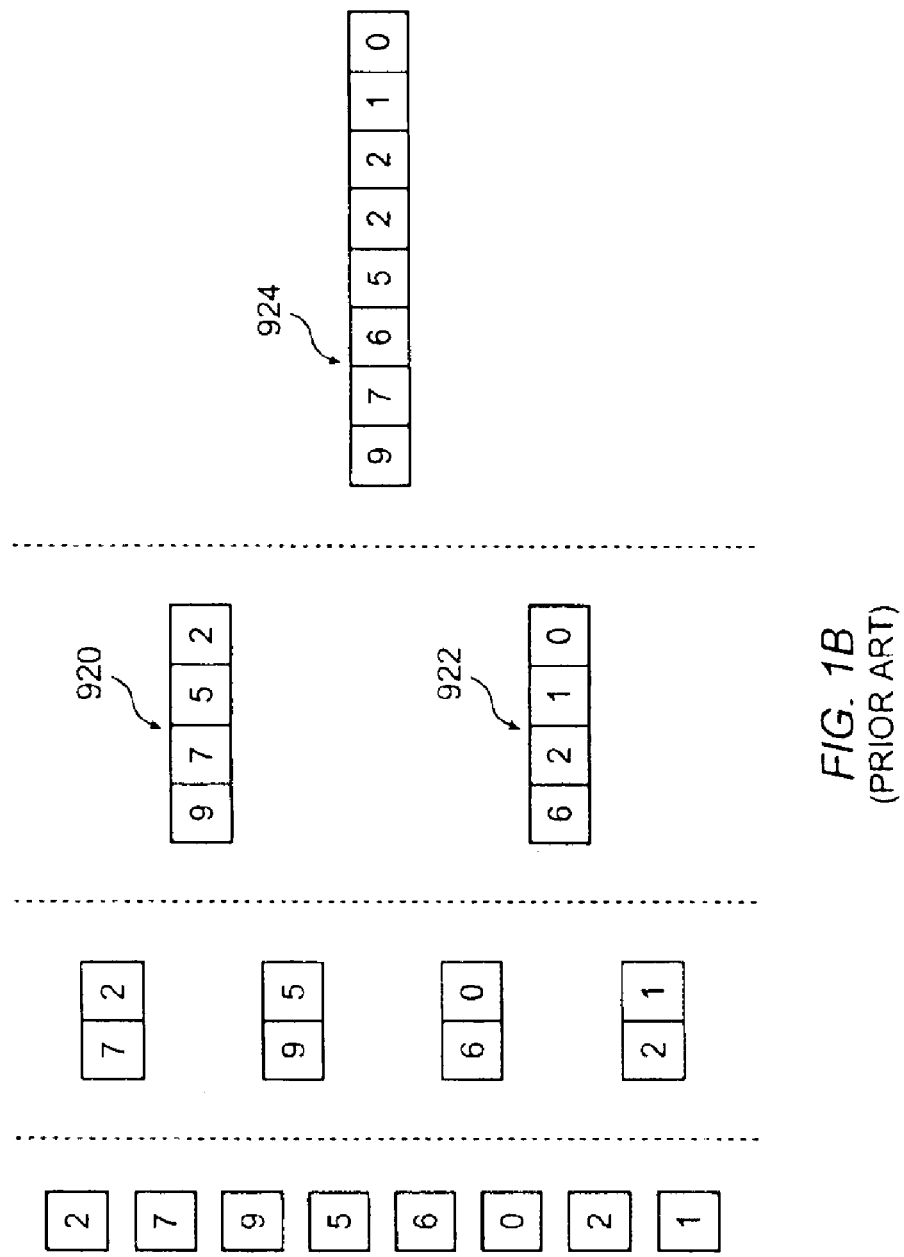
FIG. 1B is a schematic representation of a prior art merge sort.
Figure 10:
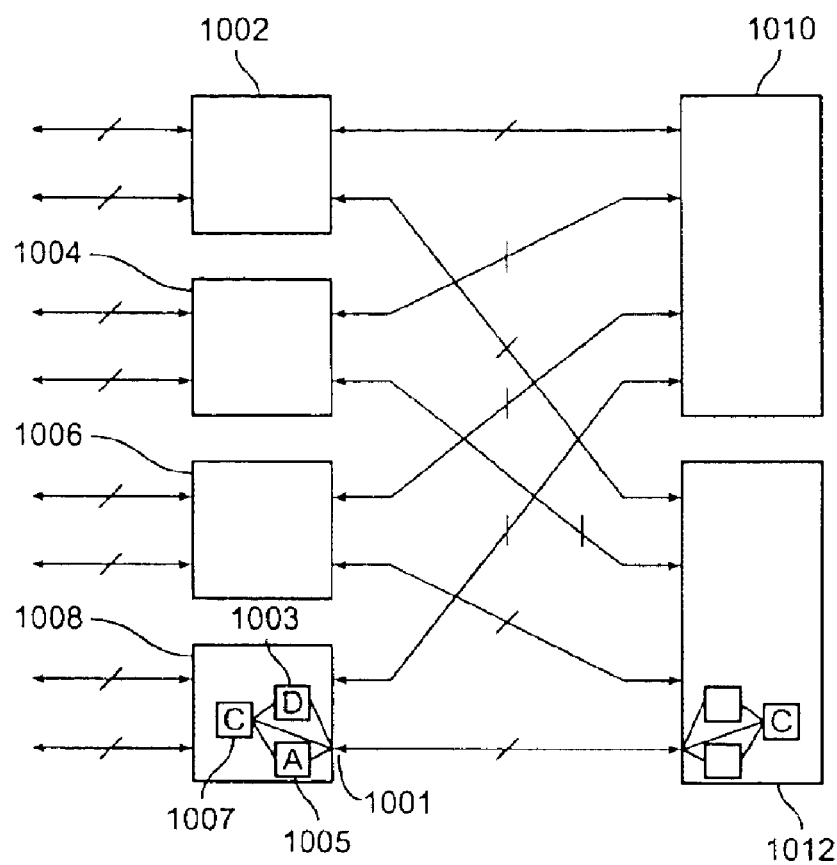
FIG. 10 is a block diagram of a folded interconnection network.
Figure 11:
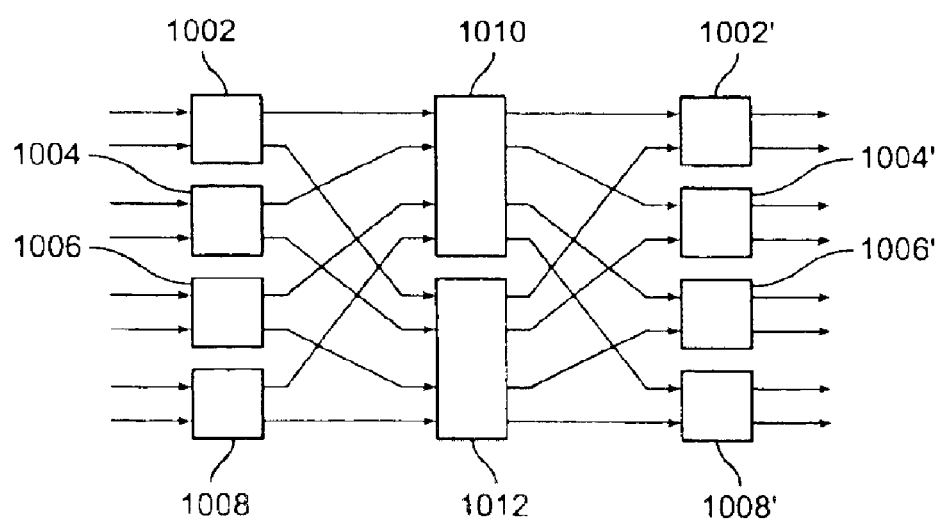
FIG. 11 is a block diagram of an unfolded interconnection network equivalent to the folded network of FIG. 10.

FIG. 10 shows an exemplary folded network topology. Note that each switch element 1002, 1004, 1006, 1008, 1010, 1012 in FIG. 10 has four inputs and four outputs (each line being actually a pair of oppositely directed links), to be compared with the network in FIG. 1A, but with the inputs and outputs arranged in a different pattern. In FIG. 10, a packet enters the network at the left, passing into one of switch elements 1002, 1004, 1006, 1008. The packet travels to one of switch elements 1010, 1012, and then back through another one of switch elements 1002, 1004, 1006, 1008, and from there to its ultimate destination. Within the switch elements, such as switch element 1008, at each interswitch element i/o port 1001 there is both a departure buffer 1003 and an arrival buffer 1005, as well as a control subsystem 1007. Arriving packets on one of the traces are addressed to the arrival buffer 1005 or to the control subsystem 1007. Departing interswitch-element packets originate from either the control subsystem 1007 or are relayed from the departure buffer 1003. FIG. 11 shows an unfolded representation of the network of FIG. 10. In this representation, packets move consistently from left to right through the network, and switch elements 1002, 1004, 1006, 1008, each containing a first group of arrival and departure buffers (not shown) are shown to correspond to switch elements 1002', 1004', 1006', 1008', each containing a second group of arrival and departure buffers (not shown), so that the network as a whole has just six physical components, not 10. The switch elements 1002, 1002', etc. each share a common control structure. This equivalent unfolded representation makes it clear that the inventive distributed resequencing methods described above for unfolded networks can be directly re-cast for use in a folded network.

Folded networks can be constructed with more than two levels of switch elements, just as unfolded networks can be constructed with more than three stages. In general, a k-level folded network corresponds to a 2k-1 stage unfolded network. Where the unfolded network with d-port switch elements and 2k-1 stages has $d^k$ inputs and outputs, the folded network with k levels has $d^k/2^{k-1}$ inputs and outputs.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A method for distributed resequencing of packets in a packet switching system, the method comprising:

identifying one or more floor indications received by a switching element, each of said one or more floor indications associated with a respective timestamp value;

identifying one or more data packets received by the switching element, each of said one or more data packets associated with a respective timestamp value;

finding an earliest timestamp value associated with said one or more floor indications and said one or more data packets;

in response to making a determination that not one of said data packets has associated therewith the earliest timestamp value, always discontinuing forwarding of said one or more data packets for the remaining duration of a current cell time; and in response to identifying that a particular data packet of said data packets has associated therewith the earliest timestamp value, forwarding the particular data packet during the current cell time; wherein said forwarding the particular data packet during the current cell time includes removing the particular data packet from an arrival buffer and if said removing causes the arrival buffer to become empty, in response adding a new floor indication to the arrival buffer.

2. The method of claim 1, wherein time remains in the current cell time to forward at least one of said one or more data packets when said discontinuing forwarding of said one or more data packets during the current cell time is performed.

3. An apparatus for distributed resequencing of packets in a packet switching system, the method comprising:

means for identifying one or more floor indications received by a switching element, each of said one or more floor indications associated with a respective timestamp value;

means for identifying one or more data packets received by the switching element, each of said one or more data packets associated with a respective timestamp value;

means for finding an earliest timestamp value associated with said one or more floor indications and said one or more data packets;

means for always discontinuing forwarding of said one or more data packets for the remaining duration a current cell time in response to making a determination that not one of said data packets has associated therewith the earliest timestamp value; and means for forwarding the particular data packet during the current cell time in response to identifying that a particular data packet of said data packets has associated therewith the earliest timestamp value; wherein said means for forwarding the particular data packet during the current cell time includes means for removing the particular data packet from an arrival buffer and if said removing causes the arrival buffer to become empty, in response adding a new floor indication to the arrival buffer.

4. The apparatus of claim 3, wherein time remains in the current cell time to forward at least one of said one or more data packets when said discontinuing forwarding of said one or more data packets during the current cell time is performed.

5. A method for distributed resequencing of packets in a packet switching system, the method comprising:

identifying one or more floor indications received by a switching element, each of said one or more floor indications associated with a respective timestamp value;

identifying one or more data packets received by the switching element, each of said one or more data packets associated with a respective timestamp value;

finding an earliest timestamp value associated with said one or more floor indications and said one or more data packets;

in response to making a determination that not one of said data packets has associated therewith the earliest timestamp value, always discontinuing forwarding of said one or more data packets for the remaining duration of a current cell time; and in response to identifying that a particular data packet of said data packets has associated therewith the earliest timestamp value, forwarding the particular data packet during the current cell time.

6. The method of claim 5, wherein time remains in the current cell time to forward at least one of said one or more data packets when said discontinuing forwarding of said one or more data packets during the current cell time is performed.

7. An apparatus for distributed resequencing of packets in a packet switching system, the method comprising:

means for identifying one or more floor indications received by a switching element, each of said one or more floor indications associated with a respective timestamp value;

means for identifying one or more data packets received by the switching element, each of said one or more data packets associated with a respective timestamp value;

means for funding an earliest timestanp value associated with said one or more floor indications and said one or more data packets;

means for always discontinuing forwarding of said one or more data packets for the remaining duration of a current cell time in response to making a determination that not one of said data packets has associated therewith the earliest timestamp value; and means for forwarding the particular data packet during the current cell time in response to identifying that a particular data packet of said data packets has associated therewith the earliest timestamp value.

8. The apparatus of claim 7, wherein time remains in the current cell time to forward at least one of said one or more data packets when said discontinuing forwarding of said one or more data packets during the current cell time is performed.

* * * * *

UNITED STATES PATENT AND TRADEMARK OFFICE
CERTIFICATE OF CORRECTION

PATENT NO. : 6,907,041 B1
DATED : June 14, 2005
INVENTOR(S) : Turner et al.

It is certified that error appears in the above-identified patent and that said Letters Patent is hereby corrected as shown below:

Column 1,
Line 5, replace "IVENTIONS" with -- INVENTIONS --.

Column 2,
Line 54, replace "list" with -- lists --.
Line 57, replace "an" with -- can --.
Line 58, replace "list" with -- lists --.
Line 60, replace "genely" with -- generally --.

Column 5,
Line 55, replace "purposes," with -- purposes; --.

Column 7,
Lines 26-27, replace "single-buffer" with -- single buffer --.

Column 8,
Line 37, replace "10g$_2$ T" with -- $\log_2 T$ --.

Column 11,
Line 42, replace "here," with -- here; --.

Column 16,
Line 34, replace "funding" with -- finding --.
Line 34, replace "timestanp" with -- timestamp --.

Signed and Sealed this

Thirteenth Day of September, 2005

JON W. DUDAS
*Director of the United States Patent and Trademark Office*